United States Patent
Iwakura et al.

(10) Patent No.: US 9,601,980 B2
(45) Date of Patent: Mar. 21, 2017

(54) ELECTROMECHANICAL TRANSDUCER AND ELECTROACOUSTIC TRANSDUCER

(71) Applicant: Rion Co., Ltd., Tokyo (JP)

(72) Inventors: Takashi Iwakura, Tokyo (JP); Fumitaka Funahashi, Tokyo (JP)

(73) Assignee: RION CO., LTD., Tokyo (JP)

( * ) Notice: Subject to any disclaimer, the term of this patent is extended or adjusted under 35 U.S.C. 154(b) by 526 days.

(21) Appl. No.: 14/172,681

(22) Filed: Feb. 4, 2014

(65) Prior Publication Data
US 2015/0207392 A1    Jul. 23, 2015

(30) Foreign Application Priority Data

Jan. 21, 2014  (JP) ................... 2014-008542

(51) Int. Cl.
*H02K 33/00* (2006.01)
*H04R 11/00* (2006.01)
*H04R 11/02* (2006.01)

(52) U.S. Cl.
CPC ............. *H02K 33/00* (2013.01); *H04R 11/02* (2013.01)

(58) Field of Classification Search
CPC ........ H02K 35/06; H02K 33/00; H02K 33/06; H02K 33/12; H02K 33/16; H02K 33/18; H04R 1/00; H04R 11/00; H04R 11/02; H04R 11/04; H04R 25/00; H04R 2460/13; H04R 9/025; H04R 9/066; H01F 7/16; B60B 1/00
See application file for complete search history.

(56) References Cited

U.S. PATENT DOCUMENTS

| 1,784,517 A | * | 12/1930 | Farrand | ................ H04R 11/00 335/231 |
| 4,473,722 A | | 9/1984 | Wilton | |
| 7,869,610 B2 | | 1/2011 | Jayanth et al. | |

(Continued)

FOREIGN PATENT DOCUMENTS

| GB | 2 085 694 A | 4/1982 |
| JP | 2006-041768 | 2/2006 |

(Continued)

OTHER PUBLICATIONS

European Search Report dated May 16, 2014.

*Primary Examiner* — Tran Nguyen
(74) *Attorney, Agent, or Firm* — McGinn IP Law Group, PLLC.

(57) ABSTRACT

An electromechanical transducer of the invention comprises a structural unit, an armature, and two elastic units. The structural unit includes magnets, a yoke and a coil. The armature has an inner portion disposed to pass through inside the structural unit and two outer portions protruding from the inner portion, and the armature constitutes a magnetic circuit with the structural unit via two regions through which components of the magnetic flux flow in reverse directions in the inner region. The elastic units give restoring forces to the outer portions in response to displacement of the armature due to magnetic forces of the magnetic circuit. Each of the elastic units includes a pair of elastic members symmetrically arranged via the armature in a direction of the displacement. Each of the elastic members has one end engaging one of the outer portions and another end engaging one of the elastic member attaching portions.

14 Claims, 8 Drawing Sheets

(56) References Cited

U.S. PATENT DOCUMENTS

| | | | |
|---|---|---|---|
| 9,301,054 B2* | 3/2016 | Iwakura | H02K 35/06 310/81 |
| 2005/0135651 A1* | 6/2005 | Hakansson | H04R 9/025 381/396 |

FOREIGN PATENT DOCUMENTS

| | | |
|---|---|---|
| JP | 2009-267779 A | 11/2009 |
| JP | 2013-138292 A | 7/2013 |

* cited by examiner

ELECTROMECHANICAL TRANSDUCER AND ELECTROACOUSTIC TRANSDUCER

BACKGROUND OF THE INVENTION

Field of the Invention

The present invention relates to an electromechanical transducer that transduces an electric signal into mechanical vibration and an electroacoustic transducer that transduces an electric signal into sound, and particularly relates to an electromechanical transducer and an electroacoustic transducer that comprise a driving unit including an armature, a yoke, a coil and magnets.

Description of Related Art

An electroacoustic transducer used in a hearing aid or the like is provided with a driving unit including an armature, a yoke, a coil and a pair of magnets, etc., and is configured to drive the armature in response to an electric signal supplied to the coil so that relative vibration between the armature and other members is transduced into sound. For example, as examples of a so-called balanced armature type (hereinafter, referred to as "balanced type") electromagnetic transducer, Patent Reference 1 discloses a structural example of a magnetic circuit using a U-shaped armature, and Patent Reference 2 discloses a structural example of a magnetic circuit using an E-shaped armature. Patent Reference 3 discloses a structural example for improving shock resistance in an electroacoustic transducer provided with a magnetic circuit of the above-mentioned balanced type. In any of these structural examples, the armature is connected to the yoke so as to form the magnetic circuit. Further, in any of the above cases, the armature needs to be formed so that restoring force due to elasticity of the armature itself when one end thereof is displaced is larger than magnetic forces (attraction) of the magnets that are generated by the displacement of the armature. In case of employing the structures disclosed in the Patent References 1 to 3, it is essential to form the armature using soft magnetic material.

[Patent Reference 1] U.S. Pat. No. 7,869,610
[Patent Reference 2] U.S. Pat. No. 4,473,722
[Patent Reference 3] Japanese Patent Application Laid-open No. 2006-041768

However, in the above conventional balanced type electromagnetic transducer, since the armature constitutes a part of the magnetic circuit, it is required to satisfy design requirements for magnetic property of the magnetic circuit. Although the armature is required to be designed so that the restoring force caused by displacement of the armature is larger than the magnetic forces of the magnets, as described above, the armature of the conventional structure is required to be designed so as to satisfy both magnetic and mechanical requirements because the armature gets the restoring force due to the elasticity of its own. For example, in order to improve the shock resistance of the armature, an option is to increase thickness of the armature. However, if the thickness of the armature is increased, it is not possible to obtain sufficient amount of displacement within an elasticity range of the armature. Further, since the armature is required to have necessary magnetic property, it is difficult to use general spring material having large yield stress and strong shock resistance. In general, magnetic annealing treatment is performed for the armature after forming process for the purpose of extracting the magnetic property of its material, and therefore it is also difficult to increase the yield stress of the armature by heat treatment. As described above, according to the conventional structure, it is inevitable that degree of freedom in designing the armature is largely restricted.

SUMMARY

One of aspects of the invention is an electromechanical transducer transducing an electric signal into mechanical vibration, the electromechanical transducer comprising: a structural unit in which at least one pair of magnets (15 to 18) a yoke (12, 13) conducting a magnetic flux generated by the magnets, and a coil (14) supplied with the electric signal are integrally arranged; an armature (19) having an inner portion (19a) disposed to pass through an internal space of the structural unit and first and second outer portions (19b, 19c) protruding on both sides from the inner portion, the armature constituting a magnetic circuit with the structural unit via two regions through which components of the magnetic flux flow in directions opposite to each other in the inner portion; a first elastic unit (24, 25) giving a restoring force to the first outer portion in response to displacement of the armature due to a magnetic force of the magnetic circuit, the first elastic unit being held between the first outer portion and the structural unit; and a second elastic unit (26, 27) giving a restoring force to the second outer portion in response to displacement of the armature due to a magnetic force of the magnetic circuit, the second elastic unit being held between the second outer portion and the structural unit, wherein each of the first and second units includes a pair of elastic members being symmetrically arranged via the armature in a direction of displacement of the armature, the structural unit is provided with a plurality of elastic member attaching portions (12b, 12c, 13b, 13c) to which the elastic members are attached, respectively, and each of the elastic members has one end engaging the first or second outer portion and another end engaging one of the elastic member attaching portions.

According to the electromechanical transducer of the invention, when no current flows in the coil, the armature is initially in a state of being positioned at a predetermined position of an internal space of the structural unit, and the armature is relatively displaced by magnetic forces applied to the inner portion due to a current flowing in the coil. Then, each of the first and second elastic units gives a restoring force to the armature in response to the displacement of the armature. Thus, since a structure for utilizing the restoring forces of the two elastic units attached to both ends of the armature is employed without utilizing elasticity of the armature itself, it is possible to improve the degree of freedom in designing the armature by obtaining sufficient amount of displacement thereof without reducing thickness of the armature. Further, one pair of elastic members included in each of the first and second elastic units are arranged to engage the first or second outer portion and the elastic member attaching portions, and are not required to be fixed by welding or adhesive, thereby further improving shock resistance by avoiding concentration of stress on portions fixed by welding or adhesive.

In the invention, for example, a pair of spring members can be used as the pair of elastic members. In this case, a desired restoring force can be given by appropriately setting elasticity of each of the spring members. Further, each of the spring members may have a first attaching portion formed to have a concave shape to which the first or second outer portion can be attached and a second attaching portion formed to have a concave shape to which one of the elastic member attaching portions can be attached, and thereby the spring members and the armature engage each other and the spring members and the elastic member attaching portions also engage each other. For example, each of the first and second attaching may be formed to have a concave shape, the first or second outer portion may have one or more dent portions formed to engage the first attaching portion, and each of the elastic member attaching portions may have a shape engaging the second attaching portion. This structure makes it possible to restrict movement of the spring members in a lateral direction relative to the armature and the elastic member attaching portions without fixing by welding or adhesive. Further, it is preferable to use a leaf spring formed in a ring shape having curved portions as each of the spring members. By using such a leaf spring, it is possible to avoid the concentration of stress on certain portions of the leaf spring and to easily set a required spring constant in accordance with curvature of the curved portions and thickness of the leaf spring.

In the invention, the armature may be formed to have an armature body and armature reinforcing plates connected to portions contacting the elastic members on both surfaces of the armature body. Further, it is possible to employ a structure in which the yoke is composed of first and second yokes facing each other in the direction of displacement of the armature, and one of the pair of elastic members contacts a predetermined position of the first yoke, while the other of the pair contacts a predetermined position of the second yoke.

In the invention, two pairs of magnets facing each other with air gaps in the two regions of the armature may be used. However, at least one pair of magnets can constitute the magnetic circuit. This structure makes it possible to easily form two components of the magnetic flux that flow in directions opposite to each other in the respective regions on both sides of the armature.

Another aspect of the invention is an electroacoustic transducer transducing an electric signal into sound, the electroacoustic transducer comprising not only the structural unit, the armature, the first and second elastic units, but also a pair of rods (51, 52) each having one end fixed to each of ends of the first and second outer portions of the armature; a diaphragm (54*a*) connected to respective other ends of the pair of rods, the diaphragm generating sound pressure in response to vibration of the armature relative to the structural unit; and a housing (50) to which the structural unit is fixed, the housing holding the diaphragm to be able to vibrate and having a through hole for outputting sound generated by vibration of the diaphragm. The electroacoustic transducer of the invention can achieve the same effects as the above-described electromechanical transducer.

As described above, according to the present invention, the pair of elastic units held between both ends of the armature and the structural unit is provided in order to give the restoring force for the displacement of the armature, without utilizing the elasticity of the armature itself, thereby improving degree of freedom in designing the armature. Further, the one pair of elastic members included in each of the elastic units is arranged in a state of contacting the armature and upper and lower predetermined positions of the structural unit without being fixed by welding or adhesive, and thus it is possible to avoid concentration of stress caused by a shock on portions fixed by welding or adhesive, thereby further improving shock resistance. In this manner, the present invention enables both excellent magnetic characteristics and the shock resistance, and it is possible to achieve a small-scale and high-power electromechanical transducer and/or electroacoustic transducer.

DETAILED DESCRIPTION OF THE PREFERRED EMBODIMENTS

Preferred embodiments of the present invention will be described with reference to accompanying drawings. Each of the following embodiments will support an example to which the present invention is applied, and the present invention is not limited to the embodiments. In the following, the present invention will be applied to an embodiment of an electromechanical transducer that transduces an electric signal into mechanical vibration and an embodiment of an electroacoustic transducer that transduces an electric signal into sound.

Figure 1:
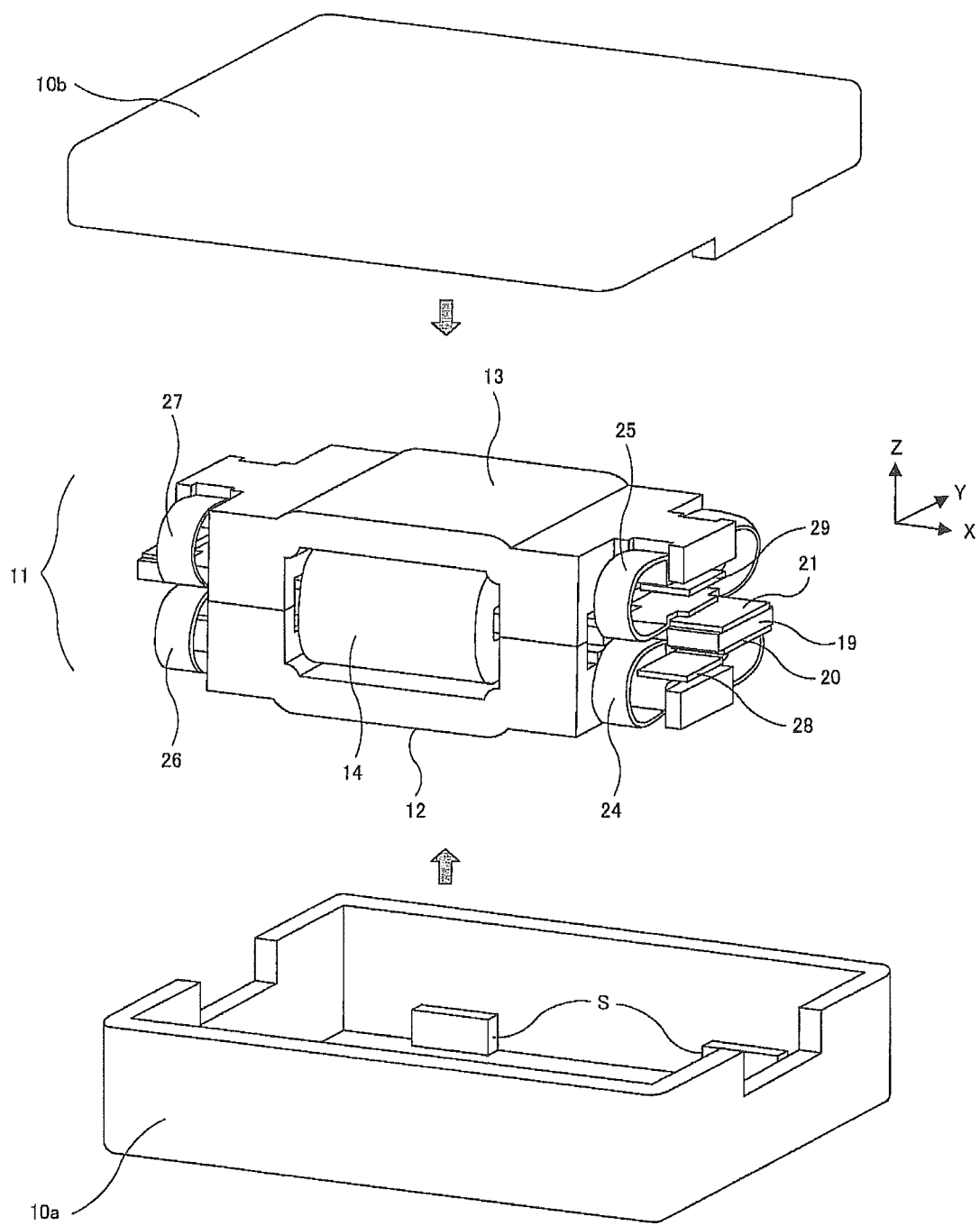
FIG. 1 is a perspective view showing a structure in which a housing that contains an entire electromechanical transducer of an embodiment is detached.
Figure 2:
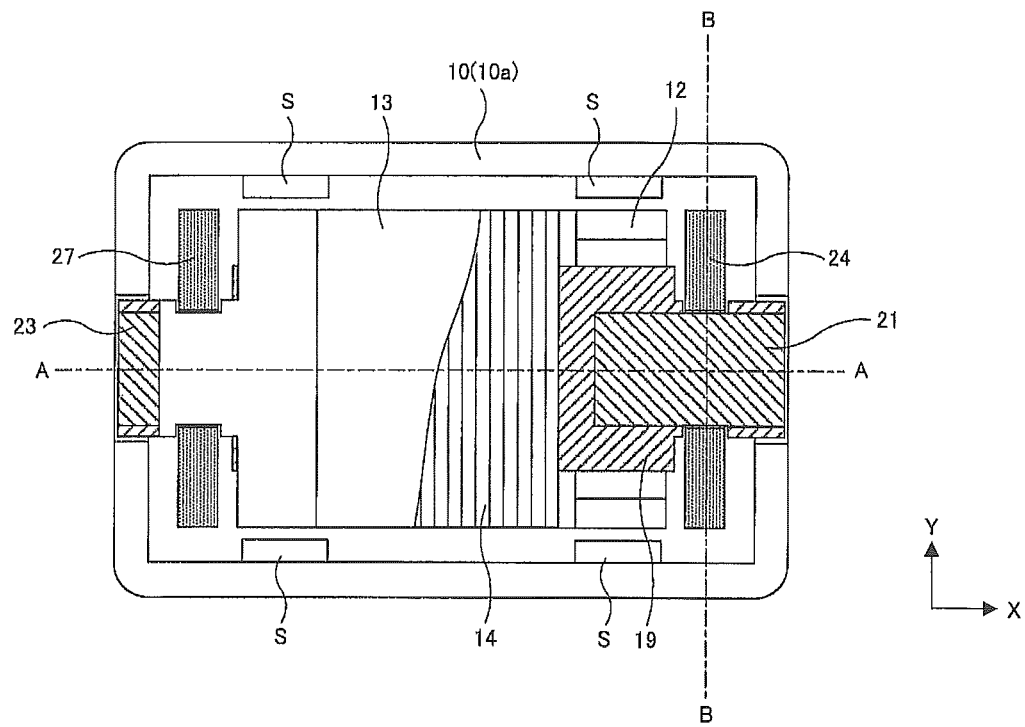
FIG. 2 is a top view showing the electromechanical transducer of the embodiment as viewed from one side in a Z direction (from the top side of FIG. 1)
Figure 3:
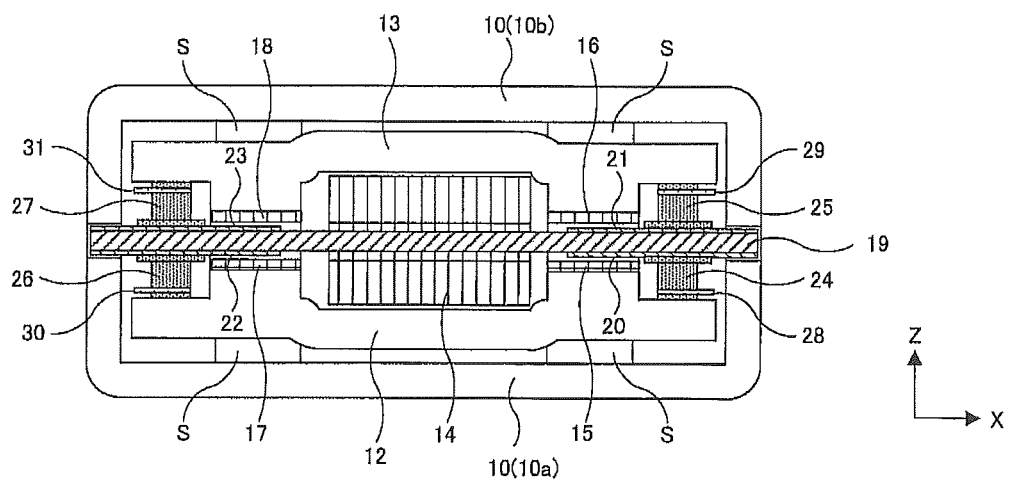
FIG. 3 is a cross-sectional view of the electromechanical transducer of the embodiment along an A-A cross section of FIG. 2.
Figure 4:
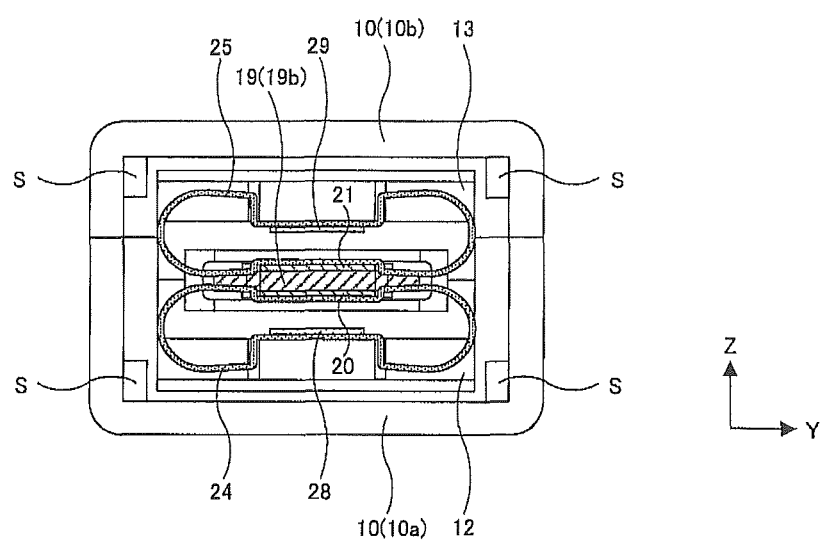
FIG. 4 is a cross-sectional view of the electromechanical transducer of the embodiment along a B-B cross section of FIG. 2.
Figure 5:
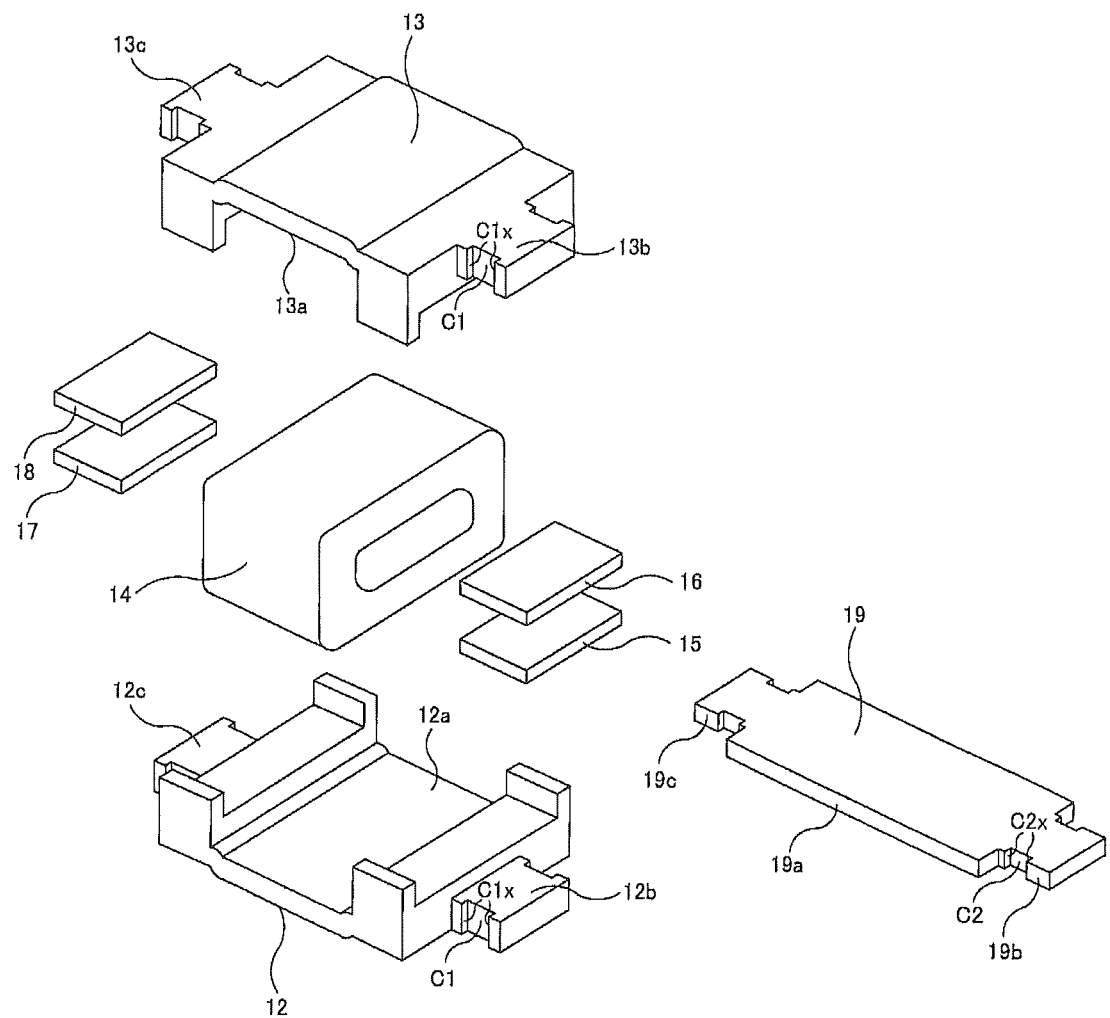
FIG. 5 is an exploded perspective view of a magnetic circuit portion in the electromechanical transducer of the embodiment.

A basic structure of an electromechanical transducer of an embodiment will be described with reference to FIGS. 1 to 5. FIG. 1 is a perspective view showing a structure in which a housing 10 that contains the entire electromechanical transducer of the embodiment is detached. FIGS. 2 to 4 are views of the electromechanical transducer of the embodiment as viewed in directions perpendicular to one another, in which an X direction, a Y direction and a Z direction are indicated by arrows, respectively, for purposes of illustration. FIG. 2 is a top view (partially cutaway end view in which a housing member 10*b*, a part of a yoke 13 and a magnet 16 (which will be mentioned later) are cut away) of the electromechanical transducer of the embodiment as viewed from one side in the Z direction (from the top side of FIG. 1), FIG. 3 is a cross-sectional view of the electromechanical transducer of the embodiment along an A-A cross section of FIG. 2, and FIG. 4 is a cross-sectional view of the electromechanical transducer of the embodiment along a B-B cross section of FIG. 2. Further, FIG. 5 is an exploded perspective view of a later-mentioned magnetic circuit portion in the electromechanical transducer of the embodiment. Although the electromechanical transducer of the embodiment does not have directionality of vertical and horizontal directions, the following descriptions may include expressions using the vertical and horizontal directions in accordance with directions (X, Y and Z) in the plane when viewed in the figures for the purpose of explanations.

As shown in FIG. 1, the housing 10 that houses the entire electromechanical transducer of the embodiment has a structure formed by joining a lower housing member 10a and an upper housing member 10b that are vertically symmetrical to each other. A later-mentioned driving unit 11 is contained in the housing 10. It is preferable to use as light material as possible to form the housing 10 within a strength range capable of supporting the driving unit 11 in order to make it easy to vibrate. For example, plastic material or metal material such as stainless steel can be used to form the housing 10. As shown in FIGS. 1 to 4, four stoppers S protruding inward are formed at predetermined positions inside the lower housing member 10a, and another four stoppers S are formed in the same manner inside the upper housing member 10b. These stoppers S serve to restrict a range of movement of the driving unit 11 so as to suppress excessive movement of the electromechanical transducer in the Y direction when receiving a shock. The stoppers S may be provided for the X direction. However, if the range of movement of the driving unit 11 is small relative to the shape of the housing 10, the stoppers S do not need to be provided. In addition, although all of FIGS. 2 to 4 show internal structures that are viewed when the housing 10 is partially removed, the entire electromechanical transducer is actually covered by the housing 10 having the structure of FIG. 1.

The driving unit 11 includes a pair of yokes 12 and 13, a coil 14, four magnets 15, 16, 17 and 18, an armature 19, four armature reinforcing plates 20, 21, 22 and 23, four spring members 24, 25, 26 and 27, and four spring reinforcing plates 28, 29, 30 and 31. In the driving unit 11, the yokes 12 and 13, the coil 14, and the four magnets 15 to 18 function as an integrally arranged structural unit of the invention, and the armature 19 penetrating an internal space of this structural unit is disposed so as to be movable to the driving unit 11 via the spring members 24 to 27. Further, a pair of leads for supplying an electric signal is extended from the coil 14 and is electrically connected to a pair of electric terminals provided at one end outside the housing 10, which are omitted in FIGS. 1 to 4.

The lower yoke 12 (the first yoke of the invention) and the upper yoke 13 (the second yoke of the invention) are integrally fixed to each other, for example by welding, in a state of facing each other in the Z direction. As shown in FIG. 5, inwardly facing concave portions 12a and 13a are formed in central portions of the respective yokes 12 and 13, and the coil 14 having a through hole is sandwiched between the concave portions 12a and 13a of the upper and lower yokes 12 and 13. In this structure, the coil 14 in which both ends of its through hole are open in the X direction is positioned at the center between the yokes 12 and 13 and is fixed to inner surfaces of the yokes 12 and 13 by adhesive. For example, soft magnetic material such as permalloy (45% Ni) can be used to form the yokes 12 and 13.

There are formed spring member attaching portions 12b, 12c, 13b and 13c (the elastic member attaching portions of the invention) protruding on both sides in the X direction of the yokes 12 and 13, respectively. As shown in FIG. 3, the spring members 24 and 26 contact the spring member attaching portions 12b and 12c of the yoke 12 at sides facing the armature 19, respectively, and the spring members 25 and 27 contact the spring member attaching portions 13b and 13c of the yoke 13 at sides facing the armature 19, respectively. Further, dent portions C1 (eight in total) of a concave shape are formed on both sides in the Y direction of each of the four spring member attaching portions 12b, 12c, 13b and 13c. Later-mentioned yoke attaching portions 24c to 27c (25c in FIG. 6) of the spring members 24 to 27 engage the dent portions C1. That is, the four spring member attaching portions 12b, 12c, 13b and 13c and the spring members 24 to 27 are not fixed to each other by welding or adhesive. A pair of side portions C1x of each of the dent portions C1 faces each other with a distance slightly larger than each width of the spring members 24 to 27. Therefore, appropriate interspaces (small clearances) are formed between the side portions C1x and the spring members 24 to 27. Further, since the dent portions C1 may have a structure for engaging the spring members 24 to 27, protruding portions capable of engaging the spring members 24 to 27 may be provided on the spring member attaching portions 12b, 12c, 13b and 13c at the sides facing the armature 19, instead of providing the dent portions C1. A specific structure of the spring members 24 to 27 will be described later.

The magnets 15 to 18 are arranged symmetrically in the X direction on both sides inside the yokes 12 and 13. That is, a pair of magnets 15 to 16 is adhesively bonded to one opposed end surfaces of the yokes 12 and 13 in the X direction and faces each other with an appropriate distance. Similarly, a pair of magnets 17 to 18 is adhesively bonded to the other opposed end surfaces of the yokes 12 and 13 in the X direction and faces each other with an appropriate distance.

The armature 19 (the armature body of the invention) is a long plate-like member extending in the X direction and is disposed so as to pass through a space between the pair of magnets 15 to 16, the through hole of the coil 14, and a space between the pair of magnets 17 to 18. As shown in FIG. 5, the armature 19 is composed of an inner portion 19a positioned in a space facing the yokes 12 and 13 (the internal space of the structural unit) and outer portions 19b and 19c protruding from the both sides of the inner portion 19a. The inner portion 19a of the armature 19 is formed in a rectangular portion having a width comparable to that of the magnets 15 to 18 in the Y direction, and constitutes the magnetic circuit together with the yokes 12, 13, the magnets 15 to 18 and the coil 14. The outer portions 19b and 19c of the armature 19 are formed in rectangular portions having a width narrower than the inner portion 19a in the Y direction that are partially cut away. For example, the soft magnetic material such as permalloy (45% Ni) is used to form the armature 19 in the same manner as the yokes 12 and 13.

A pair of armature reinforcing plates 20 and 21 (FIG. 3) is welded to both surfaces of the armature 19 from one outer portion 19b to a part of the inner portion 19a. Similarly, a pair of armature reinforcing plates 22 and 23 (FIG. 3) is welded to both surfaces of the armature 19 from the other outer portion 19c to a part of the inner portion 19a. Each of the four armature reinforcing plates 20 to 23 has the same rectangular shape and is formed to have the same width in the Y direction as the cut away portions of the outer portions 19b and 19c. The armature reinforcing plates 20 to 23 serve to secure thickness of portions of the armature 19 to which the spring members 24 to 27 are attached, which will be described in detail later. Here, the armature 19 and the armature reinforcing plates 20 to 23 integrally function as the armature of the invention. In case where the thickness of the armature 19 can be sufficiently secured in consideration of designs of the magnetic circuit and the spring members 24 to 27, there is no need to provide the armature reinforcing plates 20 to 23.

Figure 7:
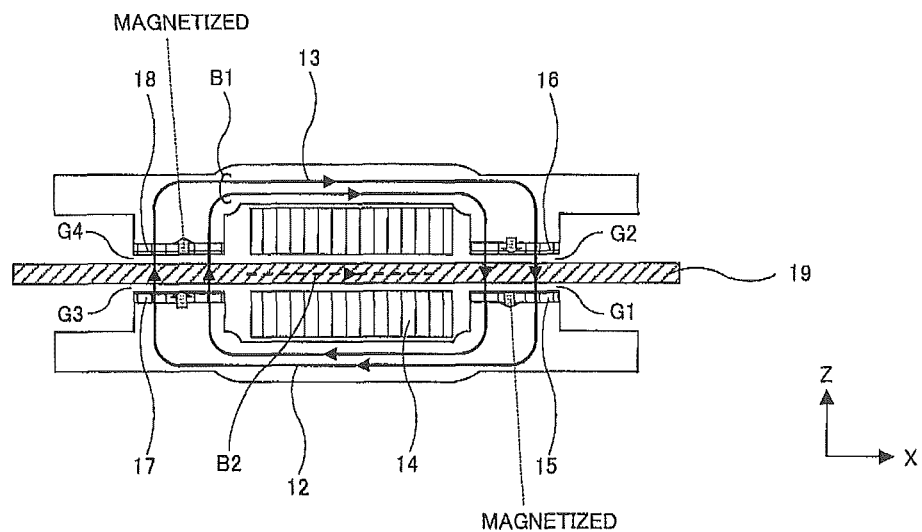
FIG. 7 is a view schematically showing a part constituting the magnetic circuit in the cross-sectional view of FIG. 3.

As shown in FIG. 3, there are formed parallel interspaces between the armature 19 and the magnets 15 to 18 above and below the armature 19 (both sides in the Z direction) via the above-described armature reinforcing plates 20 to 23, and the respective interspaces form air gaps G1, G2, G3 and G4 (FIG. 7). Since the four magnets 15 to 18 have the same shape as one another and are symmetrically arranged in the X and Y directions, the four gaps G1 to G4 also have the same shape as one another. The interspaces of the air gaps G1 to G4 are appropriately formed so that the armature 19 does not contact the coil 14 and the magnets 15 to 18 when the armature 19 is displaced in the Z direction within a normal working range.

Further, each of the outer portions 19b and 19c of the armature 19 is sandwiched between the housing members 10a and 10b via the armature reinforcing plates 20 to 23 and is fixed by adhesive or the like. Here, the housing 10 is formed so as not to contact the driving unit 11 other than both ends of the armature 19. The above connection portion between the armature 19 and the housing 10 needs to have sufficient stiffness such that vibration generated in the driving unit 11 is reliably transmitted to the housing 10. The armature reinforcing plates 20 to 23 serve to improve the stiffness between the armature 19 and the housing 10.

Furthermore, dent portions C2 (four in total) of a concave shape are formed on both sides in the Y direction of each of the outer portions 19b and 19c of the armature 19. Later-mentioned armature attaching portions 24c to 27c (25c in FIG. 6) of the spring members 24 to 27 engage the dent portions C2. That is, the outer portions 19b and 19c of the armature 19 and the spring members 24 to 27 are not fixed to each other by welding or adhesive. A pair of side portions C2x of each of the dent portions C2 faces each other with a distance slightly larger than each width of the spring members 24 to 27. Therefore, appropriate interspaces (small clearances) are formed between the side portions C2x and the spring members 24 to 27. In addition, as shown in FIG. 5, the shape of one pair of dent portions C2 of one outer portion 19b overlaps the shape of one pair of dent portions C1 of the spring member attaching portions 12b and 13b of the yokes 12 and 13 in the Z direction, and the shape of one pair of dent portions C2 of the other outer portion 19c overlaps the shape of one pair of dent portions C1 of the spring member attaching portions 12c and 13c of the yokes 12 and 13 in the Z direction.

Each of the four the spring members 24 to 27 is a leaf spring formed by bending a plate-like member, a pair of the spring members 24 and 25 (the first elastic unit of the invention) is attached to one outer portion 19b of the armature 19, and a pair of the spring members 26 and 27 (the second elastic unit of the invention) is attached to the other outer portion 19c of the armature 19. The role of the spring members 24 to 27 is that, when the armature 19 is relatively displaced in the magnetic circuit relative to the structural unit, the spring members 24 to 27 give a restoring force that is proportional to amount of the displacement of the armature 19. As shown in FIG. 4, the lower spring member 24 (26) and the upper spring member 25 (27) are symmetrically arranged in the Z direction in a state of sandwiching the armature 19 from both sides in the Z direction. Hereinafter, a structure of each of the spring members 24 to 27 will be described with reference to a perspective view of FIG. 6.

Figure 6:
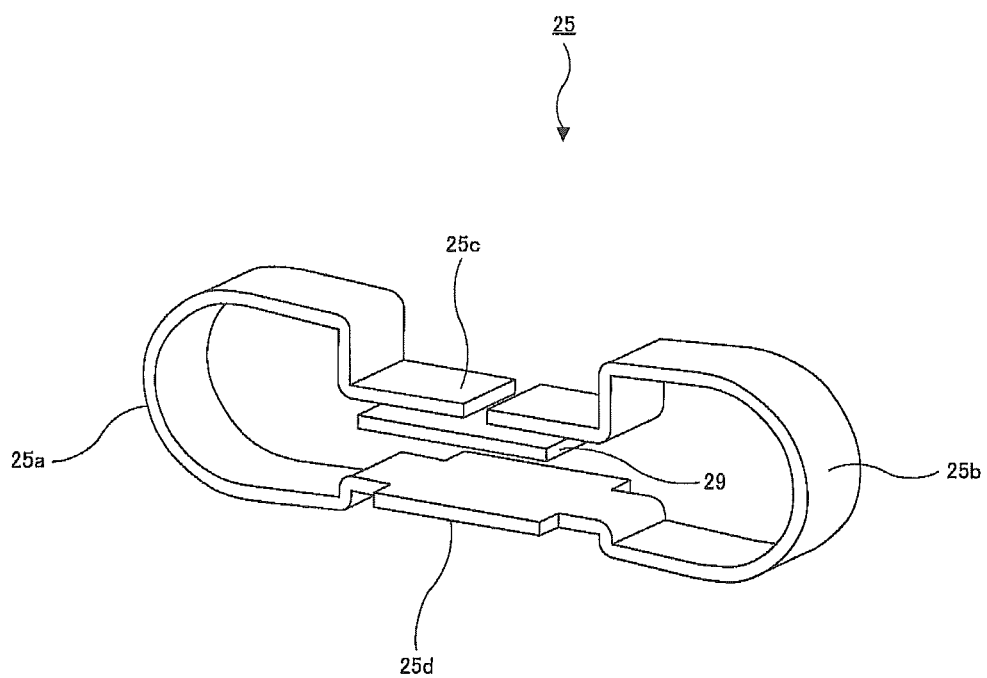
FIG. 6 is a perspective view showing a structure of a spring member and a spring reinforcing plate.

Although FIG. 6 representatively shows a structure of the spring member 25 and the spring reinforcing plate 29, other spring members 24, 26 and 27 and other spring reinforcing plates 28, 30 and 31 have the same structure. As shown in FIG. 6, the spring member 25 includes two curved portions 25a and 25b on both sides in the Y direction, and a yoke attaching portion 25c and an armature attaching portion 25d, which are inwardly facing concave portions vertically opposed to each other at the center. In addition, the spring members 24, 26 and 27 (not shown in FIG. 6) are also assumed to include curved portions 24a, 24b, 26a, 26b, 27a and 27b, yoke attaching portions 24c, 26c, 27c, and armature attaching portions 24d, 26d and 27d. Further, the spring reinforcing plate 29 is welded to an inner surface of the yoke attaching portion 25c (an inner side of the spring member 25). Both ends of the plate-like member used for forming the spring member 25 are connected via the spring reinforcing plate 29 at the yoke attaching portion 25c so as to form a continuous ring shape. If no cut section is formed in the spring member 25, there is no need to provide the spring reinforcing plate 29. Here, the spring member 25 and the spring reinforcing plate 29 integrally function as the elastic member of the invention.

The shape of the spring member 25 of FIG. 6 is such that, as shown in FIG. 4, the concave shape of the yoke attaching portion 25c engages the shape of the spring member attaching portion 13b of the yoke 13, and the concave shape of the armature attaching portion 25d engages the shapes of the armature 19 and the armature reinforcing plate 21. Although these engaging portions are not fixed by welding or adhesive, when the spring member 25 is mounted in the driving unit 11, it is possible to restrict movements of the spring member 25 in the X and Y directions by the respective concave shapes. Further description in this regard will be made later. The spring member 25 is stably held and contacts the spring member attaching portion 13b of the yoke 13 and the armature reinforcing plate 21, respectively. The spring member 24 is stably held in a symmetrical arrangement in the Z direction relative to the spring member 25. Here, the gap between the yoke attaching portions 24c and 25c and the armature attaching portions 24d and 25d is set to be larger than the gap between the spring member attaching portions 12b and 13b and the armature 19 so that the pair of spring members 24 and 25 placed between the yokes 12 and 13 pushes and sandwiches the armature 19 on both sides thereof.

Although, in the structure of the spring member 25 of FIG. 6, each of the curved portions 25a and 25b has a cross-sectional shape approximately of a circular arc, various cross-sectional shapes can be used as long as the restoring force of the leaf spring can be obtained. However, by forming the curved portions 25a and 25b having a smooth cross-sectional shape such as the circular arc, there is an advantage of avoiding concentration of stress. When designing the spring members 24 to 27 of the embodiment, it is necessary to determine the shape, material and curvature of the curved portions 25a and 25b and the like, so as to obtain a spring constant in accordance with the restoring force that should be given to the armature 19. For example, non-magnetic material such as SUS for spring can be used to form the spring members 24 to 27. The thickness of the spring members 24 to 27 can be set to, for example, about 0.1 mm.

As shown in FIG. 4, the pair of spring members 24 and 25 is slightly compressed in the Z direction. That is, when the armature 19 is placed in a balanced position (the center in the Z direction), the armature 19 is in a state of being constantly pushed upward and downward by the spring members 24 and 25, and their pressing forces make it possible to maintain the armature 19 at the balanced position. Further, the pair of spring members 26 and 27 oppositely positioned in the X direction is arranged in the same manner. Effects of the restoring forces of the spring members 24 to 27 when the armature 19 is displaced based on the magnetic force of the magnetic circuit will be described later.

A feature of the spring members 24 to 27 of the embodiment is that, according to the structure to be held between the yokes 12 and 13 and the armature 19, the spring members 24 to 27 are maintained in a state of contacting respective surfaces of the yoke attaching portions 24c to 27c and the armature attaching portions 24d to 27d without being fixed by welding or adhesive. For example, when employing a structure for fixing the spring members 24 to 27 to the armature 19 by welding, a shock applied to the electromechanical transducer causes concentration of stress on the welded portion, and thereby the electromechanical transducer is at risk of performance deterioration caused by plastic deformation of the welded portion. On the other hand, the spring members 24 to 27 of the embodiment enable to avoid the concentration of stress on the welded portion even when a shock is applied to the structural unit 11, thereby improving shock resistance.

Next, a basic operation of the electromechanical transducer of the embodiment will be described. FIG. 7 is a view schematically showing a part constituting the magnetic circuit including the yokes 12 and 13, the coil 14, the magnets 15 to 18 and the armature 19 in the cross-sectional view of FIG. 3. For simplicity of description, the armature reinforcing plates 20, 21, 22 and 23 fixed to the armature are omitted, and other components not included in the magnetic circuit are also omitted. As shown in FIG. 7, the pair of magnets 15 and 16 and the pair of magnets 17 and 18 that are oppositely arranged via the coil 14 have been magnetized in directions reverse to each other. For example, the magnets 15 and 16 on the right of FIG. 7 are magnetized downward, and the magnets 17 and 18 on the left of FIG. 7 are magnetized upward. A magnetic flux B1 indicated by solid arrows is generated in the yokes 12 and 13 and the armature 19 by the magnets 15 to 18 magnetized in this manner.

Then, magnetic forces due to partial magnetic fluxes of the magnetic flux B1 that pass through the air gaps G1 to G4 act on the armature 19. Specifically, downward forces act on the armature 19 when magnetic forces through the lower air gaps G1 and G3 become relatively strong, and upward forces act on the armature 19 when magnetic forces through the upper air gaps G2 and G4 become relatively strong. When these four forces are not balanced, the armature 19 is displaced to a side of a larger force. Thus, the armature 19 is positioned so that the four forces are balanced in a state where no current flows in the coil 14. At this point, since the armature 19 is not displaced, the magnetic flux passing through the air gap G1 and the magnetic flux passing through the air gap G2 are approximately equal to each other, and the magnetic flux passing through the air gap G3 and the magnetic flux passing through the air gap G4 are approximately equal to each other. Therefore, in the armature 19, there is no net magnetic flux flowing through a portion surrounded by the coil 14.

When flowing the current in the coil 14 in the above state, a magnetic flux having a direction according to the direction of the current is generated in the portion surrounded by the coil 14 in the armature 19. For example, FIG. 7 shows a state where a magnetic flux B2 indicated by a dashed arrow is generated in the armature 19 due to the coil current. At this point, in consideration of directionality of the magnetic fluxes B1 and B2 in FIG. 7, the generation of the magnetic flux B2 causes magnetic fluxes of the lower air gaps G1 and G3 to increase, respectively, and causes magnetic fluxes of the upper air gaps G2 and G4 to decrease, respectively. As a result, the armature 19 is displaced downward by being applied with the downward magnetic force.

When the armature 19 is displaced downward, restoring forces for returning the displaced armature 19 to its original position are acted by the spring members 24 and 27 (FIG. 3). If a sum of the restoring forces by the spring members 24 and 27 is larger than the magnetic force applied to the armature 19, it is possible to avoid that the armature 19 sticks to the magnets 15 and 17. The above-described operation is the same as an operating principle of a so-called balanced armature type electromagnetic transducer. In addition, when the coil current flows in a direction reverse to the above direction, it may be assumed that the armature 19 is displaced upward by being applied with the upward magnetic force.

Regarding a portion composed of the yokes 12 and 13, the coil 14, and the magnets 15 to 18 (the structural unit of the invention) other than the armature 19, a relative vibration between this structural unit and the armature 19 will be considered hereinafter. As described above, a driving force is generated in response to the current flowing when an electric signal is applied to the coil 14, and this driving force causes the above relative vibration. Since the both ends of the armature 19 are fixed to the housing 10 with sufficient stiffness, the driving force generated between the armature 19 and the structural unit is transmitted to the housing 10 via the armature 19 so as to vibrate the housing 10. In this manner, the electromechanical transducer of the embodiment is configured to generate mechanical vibration corresponding to the electric signal applied from outside.

Figure 8:
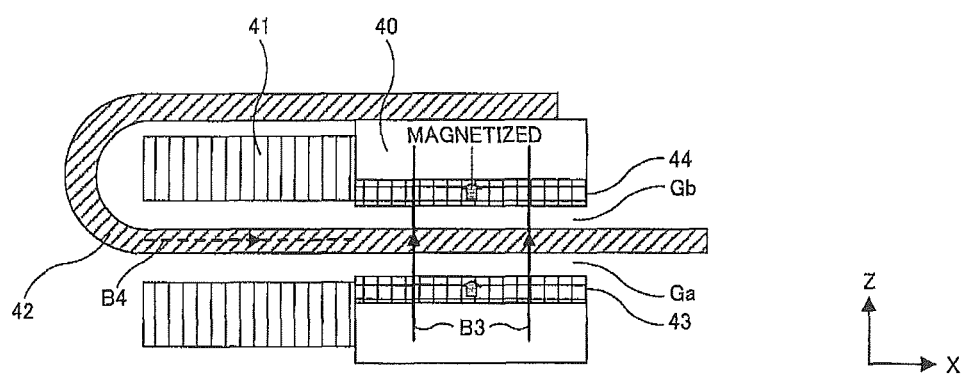
FIG. 8 is a view schematically showing a cross-sectional structure of a magnetic circuit portion in an electromagnetic transducer of a conventional balanced armature type as a comparison example to be compared with the electromechanical transducer of the embodiment.

FIG. 8 schematically shows a cross-sectional structure of a magnetic circuit portion in an electromagnetic transducer of a conventional balanced armature type as a comparison example to be compared with the electromechanical transducer of the embodiment. The magnetic circuit portion of the comparison example includes a yoke 40, a coil 41, an armature 42, and a pair of magnets 43 and 44. Further, interspaces between the pair of magnets 43 and 44 and the armature 42 form air gaps Ga and Gb. In the structure of the comparison example as shown in FIG. 8, when the armature 42 bended in a U-shape is displaced, it receives a restoring force due to elasticity of the armature 42 itself, and no members corresponding to the spring members 24 to 27 of the embodiment are provided.

Further, the magnets 43 and 44 and the air gaps Ga and Gb are provided at one side of the armature 42 in the X direction, and this portion is formed so that the armature 42 is magnetically connected to the yoke 40. The pair of magnets 43 and 44 has been magnetized in an arrow direction. Thereby, a magnetic flux B3 indicated by solid arrows is generated in the yoke 40 and the armature 42. The magnetic flux B3 flows in a YZ plane, as different from the magnetic flux B1 of FIG. 7 that flows in an XZ plan. Two magnetic forces due to partial magnetic fluxes of the magnetic flux B3 that pass through the air gaps Ga and Gb act on the armature 42. When no current flows in the coil 41, the armature 42 is positioned so that the above two magnetic forces are balanced. At this point, the magnetic fluxes passing through the upper and lower air gaps Ga and Gb become equal to each other, and in the armature 42, there is no magnetic flux flowing through a portion surrounded by the coil 41.

When flowing the current in the coil 41 in the above state, a magnetic flux is generated in the portion surrounded by the coil 41 in the armature 42. The example of FIG. 8 shows a state where a magnetic flux B4 indicated by a dashed arrow is generated in the armature 42 due to the coil current. The generation of the magnetic flux B4 causes a magnetic flux of the air gap Gb to increase and causes a magnetic flux of the air gap Ga to decrease. As a result, the armature 42 is displaced upward by being applied with the upward magnetic force. When the coil current is set to zero in this state, the armature 42 returns to its original position by being applied with the restoring force due to the elasticity of the U-shaped armature 42 itself. In this case, a driving force is generated according to the current flowing in the coil 41 to which the electric signal is applied, and this driving force vibrates the armature 42.

In the electromagnetic transducer having the structure shown in FIG. 8, a state where the armature 42 is displaced from a balanced position will be considered hereinafter. For example, when the armature 42 is displaced toward the upper air gap Gb, the restoring force due to the elasticity of the armature 42 itself is proportional to the displacement, but it acts in a direction to return the displacement. A ratio of the elasticity relative to the displacement is referred to as "positive stiffness". On the other hand, since the air gap Gb becomes small, the magnetic flux in the air gap Gb increases, and the magnetic flux in the air gap Ga decreases. As a result, an upward magnetic force acts on the armature 42. The magnitude of the magnetic force at this point is approximately proportional to the displacement of the armature 42 from the balanced position, and the direction of the magnetic force is equal to the direction of the displacement.

Meanwhile, since the direction of the above magnetic force is reverse to that of the restoring force, a ratio of this magnetic force relative to the displacement is referred to generally as "negative stiffness".

A condition for the armature 42 to return to the original position when being displaced in the air gaps Ga and Gb is that the armature 42 has the positive stiffness larger than an absolute value of the negative stiffness. However, in the electromagnetic transducer having the structure of FIG. 8, it is preferable that the absolute value of the negative stiffness is relatively large in order to enhance the driving force within a predetermined magnitude range. Accordingly, the positive stiffness of the armature 42 itself needs necessarily to be large, and thus the thickness of the armature 42 needs to be thick to obtain a large restoring force by the armature 42. The thicker the thickness of the armature 42 is, the smaller the displacement within an elasticity range is.

In order to reduce size of the electromagnetic transducer having the structure of FIG. 8 and drive it with a large amplitude, the thickness of the armature 42 needs to be thin. However, it is known that the positive stiffness of the armature 42 is proportional to the cube of the thickness, and correspondingly the negative stiffness needs to be small. As a result, even if the maximum amount of displacement can be large, the driving force of the vibration becomes small. Further, yield stress decreases due to the thinner thickness, which inevitably weakens shock resistance. That is, the electromagnetic transducer having the above structure has a trade-off relation between the maximum driving force of the vibration and the maximum amount of displacement. In this manner, according to the structure of the comparison example, since the restoring force due to the elasticity of the armature 42 itself is utilized, the thickness of the armature 42 is largely restricted in designing the armature 42.

On the other hand, in the structure of the electromechanical transducer of the embodiment, the above restriction of the thickness is not necessary in designing the armature 19, as different from the comparison example shown in FIG. 8. Specifically, the stiffness of the armature 19 of the embodiment does not depend on its thickness and is determined depending on the spring members 24 to 27 that are different components. Therefore, it is possible to determine the thickness of the armature 19 independently of a desired stiffness. When the electromechanical transducer of the embodiment receives a large shock in the Z direction in FIG. 7, the spring members 24 to 27 are deformed by an amount roughly corresponding to the size of the air gaps G1 to G4. However, by designing the spring members 24 to 27 so that deformation thereof within the elasticity range is sufficiently larger than the deformation of the above-mentioned amount, it is possible to improve the shock resistance in the Z direction. In contrast, when the conventional structure receives a large shock in the Z direction, the armature 42 itself is subjected to a large stress, and thus it is difficult to obtain sufficient shock resistance in the Z direction. Therefore, according to the electromechanical transducer to which the invention is applied, the restoring force is given to the armature 19 by using the spring members 24 to 27 as the different components without utilizing the elasticity of the armature 19 formed of the magnetic material, and the above-mentioned structural problem in FIG. 8 can be solved so as to increase both the driving force and the amount of displacement, thereby achieving a small-scale and high-power electromechanical transducer.

Further, in the electromechanical transducer of the embodiment, as previously described, the spring members 24 to 27 held between the armature 19 and the yokes 12 and 13 have the structure that is not fixed by welding or the like. However, the electromechanical transducer achieves the structure in which the spring members 24 to 27 hardly deviate from their positions even when receiving a shock. For example, since each pair of dent portions C2 of the outer portions 19b and 19c of the armature 19 and concave shapes of the spring members 24 to 27 engage each other, movements of the spring members 24 to 27 in the X and Y directions are restricted without fixing them by adhesive or the like. In other words, as to movement of the spring member 25 (FIG. 6) in the X and Y directions, since the width in the Y direction of the concave shape of the armature attaching portion 25d is only slightly larger than the width between the pair of dent portions C2 of the armature 19 that face in the Y direction, the movement in the Y direction is restricted, and since the width of each of the dent portions C2 of the armature 19 in the X direction is only slightly larger than the width in the X direction of the armature attaching portion 25d, the movement in the X direction is restricted. Further, as to movements of the spring members 25 (FIG. 6) in the Z direction, the spring member 25 does not deviate from their positions as long as the movement is within a range of depth in the Z direction of the concave shape of the spring member 25 even when the contacting surfaces of the spring member 25 separate from the armature reinforcing plate 21. By attaching the armature reinforcing plate 20 to 23 to both surfaces of the armature 19, the thickness of the armature reinforcing plates 20 to 23 are added to the thickness of the armature 19, and thus it is possible to increase the depth in the Z direction of the concave portion of the armature attaching portions 24d to 27d. In addition, the same effects are obtained for relative movements of the spring members 24 to 27 relative to the yokes 12 and 13, so description thereof will be omitted. Further, the armature reinforcing plates 20 to 23 also serve to reduce the range of movement of the armature 19 in the Z direction, and prevent the armature 19 from excessively moving in the Z direction when receiving a shock. Furthermore, the armature reinforcing plates 20 to 23 are formed of non-magnetic material.

Figure 9:
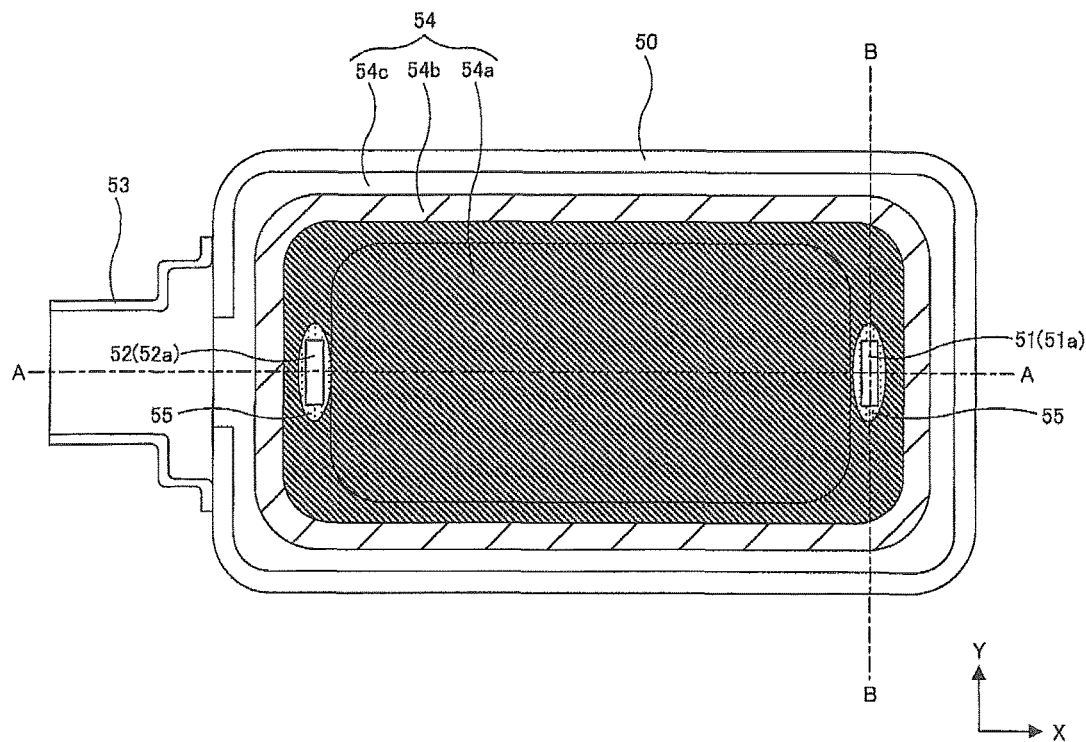
FIG. 9 is a top view showing a structure of an electroacoustic transducer of an embodiment.
Figure 10:
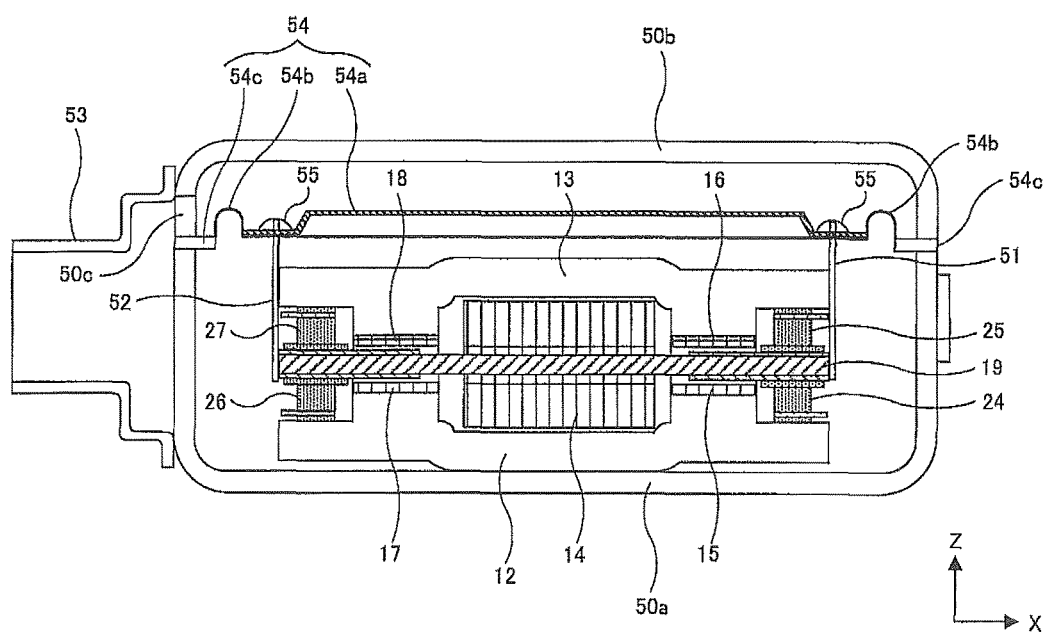
FIG. 10 is a cross-sectional view of the electroacoustic transducer of the embodiment along an A-A cross section of FIG. 9.
Figure 11:
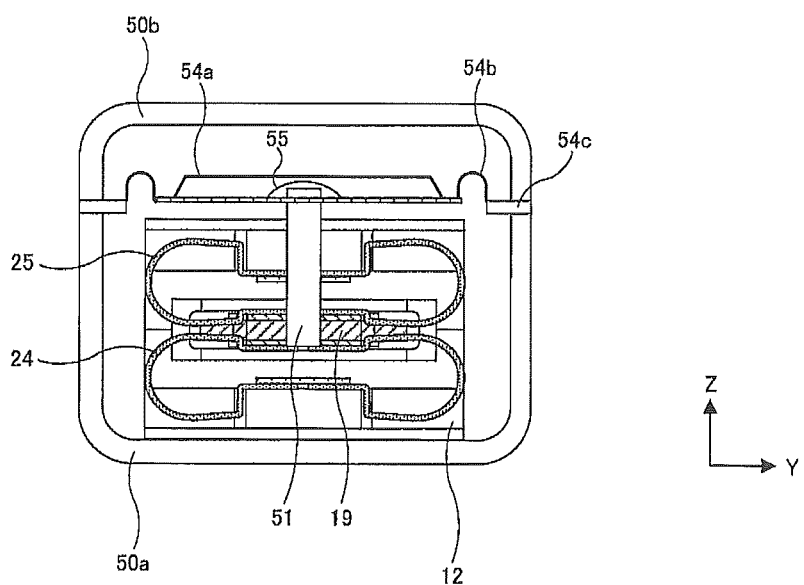
FIG. 11 is a cross-sectional view of the electroacoustic transducer of the embodiment along a B-B cross section of FIG. 9.

Next, an electroacoustic transducer of an embodiment of the present invention will be described. Although FIGS. 1 to 8 shows the example of the electromechanical transducers that transduce the electric signal into the mechanical vibration, the following embodiment will show an example of the electroacoustic transducer that transduces an electric signal into sound and outputs the sound. FIG. 9 is a top view (partially cutaway end view) showing a structure of the electroacoustic transducer of the embodiment, FIG. 10 is a cross-sectional view of the electroacoustic transducer of the embodiment along an A-A cross section of FIG. 9, and FIG. 11 is a cross-sectional view of the electroacoustic transducer of the embodiment along a B-B cross section of FIG. 9. FIGS. 9 to 11 correspond to FIGS. 2 to 4 of the electromechanical transducer of the above-described embodiment, respectively, in which the directions represented by X, Y and Z are also common.

A driving unit of the electroacoustic transducer of the embodiment has substantially the same structure as the driving unit 11 that has been described using FIGS. 1 to 5, and thus description thereof will be omitted, in which constituent elements are denoted by the same symbols as the driving unit 11 shown in FIGS. 1 to S. FIGS. 9 to 11 show a housing 50 corresponding to the housing 10 of FIG. 2, a pair of rods 51 and 52 (top end portions 51a and 52a), a sound outlet 53, and a diaphragm assembly unit 54 composed of a diaphragm 54a, a corrugation 54b and a frame portion 54c. The housing 50 has a structure formed by joining lower and upper housing members 50a and 50b, in the same manner as the housing 10 of FIG. 1. The yoke 12 is bonded to the lower housing member 50a. The diaphragm assembly unit 54 is placed directly above the driving unit 11 (FIG. 1). The frame portion 54c formed along an outer side of the diaphragm assembly unit 54 is integrally fixed to the housing 50 by laser welding at a position sandwiched between the lower and upper housing members 50a and 50b of the housing 50. A through hole 50c (FIG. 10) is formed in the housing 50 to which the diaphragm assembly unit 54 is attached, and the through hole 50 serves to output sound from a space closed by the diaphragm assembly unit 54 near the housing member 50b.

The top end portions 51a and 52a of the pair of rods 51 and 52 penetrate through two through holes on both sides of the diaphragm assembly unit 54 and are fixed thereto by adhesive 55, respectively. The rods 51 and 52 are plate-like members extending in the Z direction, respectively, and have lower end portions fixed to both ends of the armature 19 by laser welding or the like. Accordingly, the armature 19 is not fixed to the housing 50, as different from FIG. 2.

In the diaphragm assembly unit 54, a film-like corrugation 54b is expanded along an inner side of the frame portion 54c, and the diaphragm 54a is bonded all around the corrugation 54b. The role of the corrugation 54b is that, when the diaphragm 54a is vibrated in the Z direction, the corrugation 54b separates a space inside the housing 50 and effectively generates sound pressure without hindering the vibration.

Further, as shown in FIGS. 9 and 10, the sound outlet 53 is attached to the through hole SOc of the housing 50 and is fixed to the housing 50 by laser welding. Then, when the armature 19 is vertically vibrated by flowing the current in the coil 13, the sound pressure is generated by vertical translational vibration of the diaphragm 54a through the two rods 51 and 52, and sound generated by the vibration is outputted from the sound outlet 53. Although the conventional electroacoustic transducer disclosed in the Patent Reference 3 has a structure in which one side of a diaphragm is vibrated, the electroacoustic transducer of the invention has a structure in which both sides of the diaphragm 54a are vibrated, thereby achieving high-power. In addition, in order to prevent leakage of the sound from joints between the housing 50 and the frame portion 54c and joints between the housing 50 and the sound outlet 53, these joints are sealed by adhesive.

As described above, the electromechanical transducer and the electroacoustic transducer of the present invention have been described based on the embodiments. However the present invention is not limited to the above embodiments and can be variously modified without departing the essentials of the invention. For example, the electromechanical transducer of the present invention can be applied to a hearing aid that is placed in a cavum conchae of a user's ear. By this, both the vibration itself of the electromechanical transducer and the sound generated by the vibration of the housing can function as transmission means, and the sound can be transmitted to the user's ear. In case of applying such an electromechanical transducer to the hearing aid that is placed in the cavum conchae, it is preferable to form the housing 10 so as to have an outer shape suitable for being placed in the cavum conchae.

The invention claimed is:

1. An electromechanical transducer transducing an electric signal into mechanical vibration, the electromechanical transducer comprising:
   a structural unit in which at least one pair of magnets, one or more yokes conducting magnetic flux generated by the magnets, and a coil supplied with the electric signal are integrally arranged;
   a plate-like armature including an inner portion disposed to pass through an internal space of the structural unit and first and second outer portions protruding on both sides from the inner portion, the armature constituting a magnetic circuit with the structural unit via two regions through which components of the magnetic flux flow in directions opposite to each other in the inner portion and being displaced in a direction parallel to a direction of the magnetic flux at the two regions relative to the structural unit;
   air gaps respectively formed between the two regions and the structural unit;
   a first elastic unit giving a restoring force to the first outer portion in response to displacement of the armature due to a magnetic force of the magnetic circuit, the first elastic unit being held between the first outer portion and the structural unit; and
   a second elastic unit giving a restoring force to the second outer portion in response to displacement of the armature due to a magnetic force of the magnetic circuit, the second elastic unit being held between the second outer portion and the structural unit,
   wherein each of the first and second elastic units includes a pair of elastic members being symmetrically arranged via the armature in a direction of displacement of the armature,
   the structural unit is provided with a plurality of elastic member attaching portions to which the elastic members are attached, respectively,
   each of the elastic members has one end engaging the first or second outer portion and another end engaging one of the elastic member attaching portions, and
   the magnetic flux generated by the magnets is changed in accordance with a displacement of the armature.

2. The electromechanical transducer according to claim 1, wherein the pair of elastic members comprises a pair of spring members.

3. The electromechanical transducer according to claim 2, wherein each of the spring members has a first attaching portion formed to have a concave shape to which the first or second outer portion can be attached and a second attaching portion formed to have a concave shape to which one of the elastic member attaching portions can be attached, and the first or second outer portion has one or more dent portions formed to engage the first attaching portion, and each of the elastic member attaching portions has a shape engaging the second attaching portion.

4. The electromechanical transducer according to claim 2, wherein each of the spring members comprises a leaf spring formed in a ring shape including curved portions.

5. The electromechanical transducer according to claim 1, wherein the armature comprises an armature body and armature reinforcing plates connected to portions contacting the elastic members on both surfaces of the armature body, the armature reinforcing plates being made of non-magnetic material, reinforcing strength of the armature, and increasing thickness of the armature.

6. The electromechanical transducer according to claim 1, wherein the yokes are composed of first and second yokes facing each other in the direction of displacement of the armature, and each of the first and second yokes has the elastic member attaching portions, and one of the pair of elastic members engages one of the elastic member attaching portions of the first yoke, and another of the pair of elastic members engages one of the elastic member attaching portions of the second yoke.

7. The electromechanical transducer according to claim 1, wherein the at least one pair of magnets comprises two pairs of magnets facing each other with air gaps in the two regions respectively.

8. An electroacoustic transducer transducing an electric signal into sound, the electroacoustic transducer comprising:
   a structural unit in which at least one pair of magnets, a yoke conducting magnetic flux generated by the magnets, and a coil supplied with the electric signal are integrally arranged;
   an armature including an inner portion disposed to pass through an internal space of the structural unit and first and second outer portions protruding on both sides from the inner portion, the armature constituting a magnetic circuit with the structural unit via two regions through which components of the magnetic flux flow in directions opposite to each other in the inner portion;
   a first elastic unit giving a restoring force to the first outer portion in response to displacement of the armature due to a magnetic force of the magnetic circuit, the first elastic unit being held between the first outer portion and the structural unit;
   a second elastic unit giving a restoring force to the second outer portion in response to displacement of the armature due to a magnetic force of the magnetic circuit, the second elastic unit being held between the second outer portion and the structural unit;
   a pair of rods each having one end fixed to each of ends of the first and second outer portions of the armature;
   a diaphragm connected to respective other ends of the pair of rods, the diaphragm generating sound pressure in response to vibration of the armature relative to the structural unit; and
   a housing to which the structural unit is fixed, the housing holding the diaphragm to be able to vibrate and having a through hole for outputting sound generated by vibration of the diaphragm wherein each of the first and second elastic units includes a pair of elastic members being symmetrically arranged via the armature in a direction of displacement of the armature,
   the structural unit is provided with a plurality of elastic member attaching portions to which the elastic members are attached, respectively, and
   each of the elastic members has one end engaging the first or second outer portion and another end engaging one of the elastic member attaching portions.

9. The electroacoustic transducer of claim 8, wherein the armature is displaced in a direction parallel to a direction of the magnetic flux at the two regions relative to the structural unit.

10. The electroacoustic transducer of claim 8, further comprising air gaps respectively formed between the two regions and the structural unit.

11. The electroacoustic transducer of claim 9, further comprising air gaps respectively formed between the two regions and the structural unit.

12. The electroacoustic transducer of claim 9, wherein the magnetic flux generated by the magnets is changed in accordance with a displacement of the armature.

13. The electroacoustic transducer of claim 10, wherein the magnetic flux generated by the magnets is changed in accordance with a displacement of the armature.

14. An electromechanical transducer transducing an electric signal into mechanical vibration, the electromechanical transducer comprising:
   a structural unit in which at least one pair of magnets, a yoke conducting magnetic flux generated by the magnets, and a coil supplied with the electric signal are integrally arranged;
   an armature having an inner portion disposed to pass through an internal space of the structural unit and first and second outer portions protruding on both sides from the inner portion, the armature constituting a magnetic circuit with the structural unit via two regions through which components of the magnetic flux flow in directions opposite to each other in the inner portion;
   a first elastic unit giving a restoring force to the first outer portion in response to displacement of the armature due to a magnetic force of the magnetic circuit, the first elastic unit being held between the first outer portion and the structural unit; and
   a second elastic unit giving a restoring force to the second outer portion in response to displacement of the armature due to a magnetic force of the magnetic circuit, the second elastic unit being held between the second outer portion and the structural unit,
   wherein each of the first and second elastic units includes a pair of elastic members being symmetrically arranged via the armature in a direction of displacement of the armature,
   the structural unit is provided with a plurality of elastic member attaching portions to which the elastic members are attached, respectively,
   each of the elastic members has one end engaging the first or second outer portion and another end engaging one of the elastic member attaching portions, and
   the armature comprises an armature body and armature reinforcing plates connected to portions contacting the elastic members on both surfaces of the armature body, the armature reinforcing plates being made of non-magnetic material, reinforcing strength of the armature, and increasing thickness of the armature.

* * * * *